(12) United States Patent
Bouvet et al.

(10) Patent No.: US 8,882,447 B2
(45) Date of Patent: Nov. 11, 2014

(54) HYDRAULIC MACHINE, AN ENERGY CONVERSION INSTALLATION INCLUDING SUCH A MACHINE, AND THE USE OF A HYDROSTATIC LABYRINTH-BEARING IN SUCH A MACHINE

(75) Inventors: Yves Bouvet, La Terrasse (FR); Jean Francois Bertea, Saint Jean de Muzols (FR)

(73) Assignee: Alstom Renewable Technologies, Grenoble (FR)

( * ) Notice: Subject to any disclaimer, the term of this patent is extended or adjusted under 35 U.S.C. 154(b) by 1110 days.

(21) Appl. No.: 12/810,132

(22) PCT Filed: Dec. 24, 2008

(86) PCT No.: PCT/FR2008/052417
§ 371 (c)(1),
(2), (4) Date: Jun. 22, 2010

(87) PCT Pub. No.: WO2009/083695
PCT Pub. Date: Jul. 9, 2009

(65) Prior Publication Data
US 2010/0272555 A1    Oct. 28, 2010

(30) Foreign Application Priority Data
Dec. 28, 2007 (FR) ..................... 07 60415

(51) Int. Cl.
*F01D 25/22* (2006.01)
*F03B 11/00* (2006.01)
*F03B 3/02* (2006.01)

(52) U.S. Cl.
CPC ............. *F03B 3/02* (2013.01); *F03B 11/006* (2013.01); *F03B 11/002* (2013.01); *F05B 2240/53* (2013.01); *Y02E 10/226* (2013.01); *Y02E 10/223* (2013.01)
USPC ............ 415/112; 415/113; 415/229; 416/174

(58) Field of Classification Search
USPC ................ 415/110, 111, 112, 113, 229, 204; 416/174
See application file for complete search history.

(56) References Cited

U.S. PATENT DOCUMENTS 2,811,109 A * 10/1957 Higgins et al. ............... 415/112
3,188,050 A * 6/1965 Koeller ....................... 415/117

(Continued)

FOREIGN PATENT DOCUMENTS

| | | |
|---|---|---|
| AU | 411295 B2 | 3/1971 |
| FR | 1399028 | 5/1965 |

(Continued)

*Primary Examiner* — Edward Look
*Assistant Examiner* — William Grigos
(74) *Attorney, Agent, or Firm* — Buchanan Ingersoll & Rooney PC

(57) ABSTRACT

This hydraulic machine (1) has a wheel (2) mounted to move in rotation relative to a stationary structure (9) and about a stationary axis of rotation ($X_2$), the wheel (2) being designed to pass a forced flow (E) of water therethrough. A hydrostatic bearing (100), provided between firstly an element (111) constrained to rotate with the wheel (2) and, secondly a portion (91) of the stationary structure (9), is disposed between a first zone ($Z_1$) of the machine, which zone is in fluid communication with the forced flow (E) and in which zone, during operation, a pressure prevails that is similar to the pressure of the forced flow, and a second zone ($Z_2$) of the machine that is isolated from the forced flow by said bearing.

8 Claims, 4 Drawing Sheets

(56) References Cited

U.S. PATENT DOCUMENTS

| | | | |
|---|---|---|---|
| 3,398,696 A * | 8/1968 | Sproule | 415/109 |
| 3,724,966 A | 4/1973 | Sproule | |
| 4,005,747 A * | 2/1977 | Ball | 165/134.1 |
| 4,417,823 A * | 11/1983 | Drevet et al. | 384/115 |
| 4,932,836 A * | 6/1990 | Boster | 415/201 |
| 6,007,311 A * | 12/1999 | Cygnor et al. | 417/405 |
| 7,222,861 B2 * | 5/2007 | Gittler | 277/422 |
| 2004/0094901 A1 | 5/2004 | Gittler | |
| 2004/0247211 A1 * | 12/2004 | Hamke | 384/100 |

FOREIGN PATENT DOCUMENTS

| | | |
|---|---|---|
| FR | 2099384 | 3/1972 |
| GB | 1003044 | 9/1965 |
| GB | 1117745 | 6/1968 |
| JP | 57-158985 U | 10/1982 |
| JP | 59-20572 A | 2/1984 |
| JP | 02-013197 U | 1/1990 |

* cited by examiner

HYDRAULIC MACHINE, AN ENERGY CONVERSION INSTALLATION INCLUDING SUCH A MACHINE, AND THE USE OF A HYDROSTATIC LABYRINTH-BEARING IN SUCH A MACHINE

BACKGROUND OF THE INVENTION

1. Field of the Invention

The present invention relates to a hydraulic machine that has a wheel mounted to move in rotation relative to a stationary structure and about a stationary axis of rotation, which wheel is designed to pass a forced flow of water therethrough. Such a flow is at a relatively high pressure that depends, in particular, on the geometry of the machine and on the general configuration of the installation of which the machine is part, in particular on the head when the machine is a turbine. The pressure of said flow generally lies in the range 3 bars to 80 bars. The forced flow through the wheel of the machine causes said wheel to be driven in rotation when the machine is a turbine. Said flow results from said rotation when the machine is a pump. The invention is applicable to hydraulic machines of the turbine type, of the pump type, or of the pump-turbine type.

2. Brief Description of the Related Art

In hydraulic machines, e.g. Francis-type water turbines, it is known that a labyrinth can be disposed between firstly a portion of the turbine that is subjected to a water pressure similar to the pressure of the flow and secondly a "low-pressure" chamber from which the water that flows through the labyrinth can be removed towards the downstream end of the installation. The flow-rate of water that passes through the labyrinth constitutes a leak, which can be non-negligible, relative to the quantity of water brought to the turbine wheel. Said leak is not a driving flow, i.e. it is not used to drive the turbine wheel in rotation about its axis. In general, a Francis turbine also has a bearing designed to center a shaft supporting the wheel relative to its axis of rotation. Usually, a shaft seal is also provided that is designed to prevent water from flowing towards an alternator or towards some other portion of the power plant. Those various items of equipment, namely the labyrinth, the bearing, and the shaft seal, are relatively costly, and each of them requires regular maintenance, which further adds to the costs of operating a prior art Francis turbine.

Analogous problems arise with pumps, in particular with centrifugal pumps, and with turbine pumps.

SUMMARY OF THE INVENTION

More particularly, an object of the invention is to remedy those drawbacks by proposing a novel hydraulic machine in which the leaks that exist at the labyrinths in known machines are reduced significantly, thereby making it possible to increase the overall efficiency of an installation incorporating such a machine.

To this end, the invention provides a hydraulic machine having a wheel mounted to move in rotation relative to a stationary structure and about a stationary axis of rotation, the wheel being designed to pass a forced flow of water therethrough. This machine is characterized in that a hydrostatic bearing adapted to fulfill a centering function of the wheel with respect to its axis of rotation and provided between firstly an element constrained to rotate with the wheel and, secondly a portion of the stationary structure, is disposed between a first zone of the machine, which zone is in fluid communication with the forced flow and in which zone, during operation, a pressure prevails that is similar to the pressure of the forced flow, and a second zone of the machine that is isolated from the forced flow by said bearing.

In the meaning of the invention, the pressure in the first zone is similar to the pressure of the forced flow in that those pressures are of the same order of magnitude. In particular, the pressure in the first zone is substantially equal to the mean pressure of the forced flow, ignoring head loss. The pressure in the first zone is greater than 60% of the pressure in said forced flow, and preferably greater than 80% of the pressure in said forced flow.

By means of the invention, the hydrostatic bearing can perform simultaneously the functions of the labyrinth, of the bearing, and of the shaft seal of the state-of-the-art machines. In particular, the hydrostatic bearing isolates the first zone of the machine effectively from the second zone, with leaks that are considerably smaller than the leaks obtained with a state-of-the-art labyrinth. This thus makes it possible to recover a larger fraction of the quantity of water brought to the vicinity of the wheel of a turbine so that said water does indeed drive the wheel in rotation. When that machine is a pump, a larger proportion of the water moved by the wheel can be recovered at the outlet of the machine, compared with state-of-the-art machines.

In advantageous but non-essential aspects of the invention, such a machine may incorporate one or more of the following characteristics, taken in any technically feasible combination:

- the hydrostatic bearing is provided, along the axis of rotation of the wheel, at or in the vicinity of a zone of junction between the wheel and a shaft supporting the wheel;
- water injection means fed from a feed duct for bringing water to the machine, open out into the bearing, through the stationary structure portion; in which case, means are advantageously provided for increasing the pressure of the injected water relative to the pressure of the water in the duct;
- the water injection means include some series of diaphragms installed one after the other and adapted to, in conjunction with the pressure increase means, control the pressure of the water injected into the bearing;
- in a first embodiment of the invention, the element constrained to rotate with the wheel is formed by or mounted on the end of a shaft supporting said wheel; in a second embodiment, the element constrained to rotate with the wheel is formed by or mounted on a member that is integral with said wheel; in a third embodiment, the element constrained to rotate with the wheel is mounted removably on said wheel;
- water injection means open out into several cavities distributed uniformly about the axis of rotation of the wheel and provided in one of the facing surfaces of the element constrained to rotate with the wheel and of the portion of the stationary structure, between which surfaces the hydrostatic bearing is provided; and
- the radial clearance of the bearing is less than 0.5 millimeters (mm), and preferably lies in the range 0.1 mm to 0.2 mm, for a bearing of diameter lying in the range 1.5 meters (m) to 2 m; this small clearance of the bearing makes it possible to limit very considerably leakage of water through said bearing.

The invention also provides an installation for converting hydraulic energy into electrical energy, or vice versa, which installation includes a machine as mentioned above. Such an installation is simpler to manufacture and offers better technical and economical performance than state-of-the machines, in particular because maintenance is simplified.

The invention also provides the use of a hydrostatic labyrinth bearing under the conditions mentioned above, i.e. for performing: a function of providing fluid isolation between firstly a first zone of the machine that is in fluid communication with a forced flow flowing through a wheel of the machine and in which, during operation, a pressure prevails that is similar to the pressure of the forced flow, and secondly a second zone of the machine, in which zone a pressure prevails that is less than the pressure prevailing in the first zone; and a function of centering the wheel relative to its axis of rotation.

BRIEF DESCRIPTION OF THE DRAWINGS

The invention can be better understood and other advantages of the invention appear more clearly from the following description of three embodiments of a machine and of an installation that comply with the principle of the invention, the description being given merely by way of example and with reference to the accompanying drawings, in which.

DESCRIPTION OF THE PREFERRED EMBODIMENTS

Figure 1:
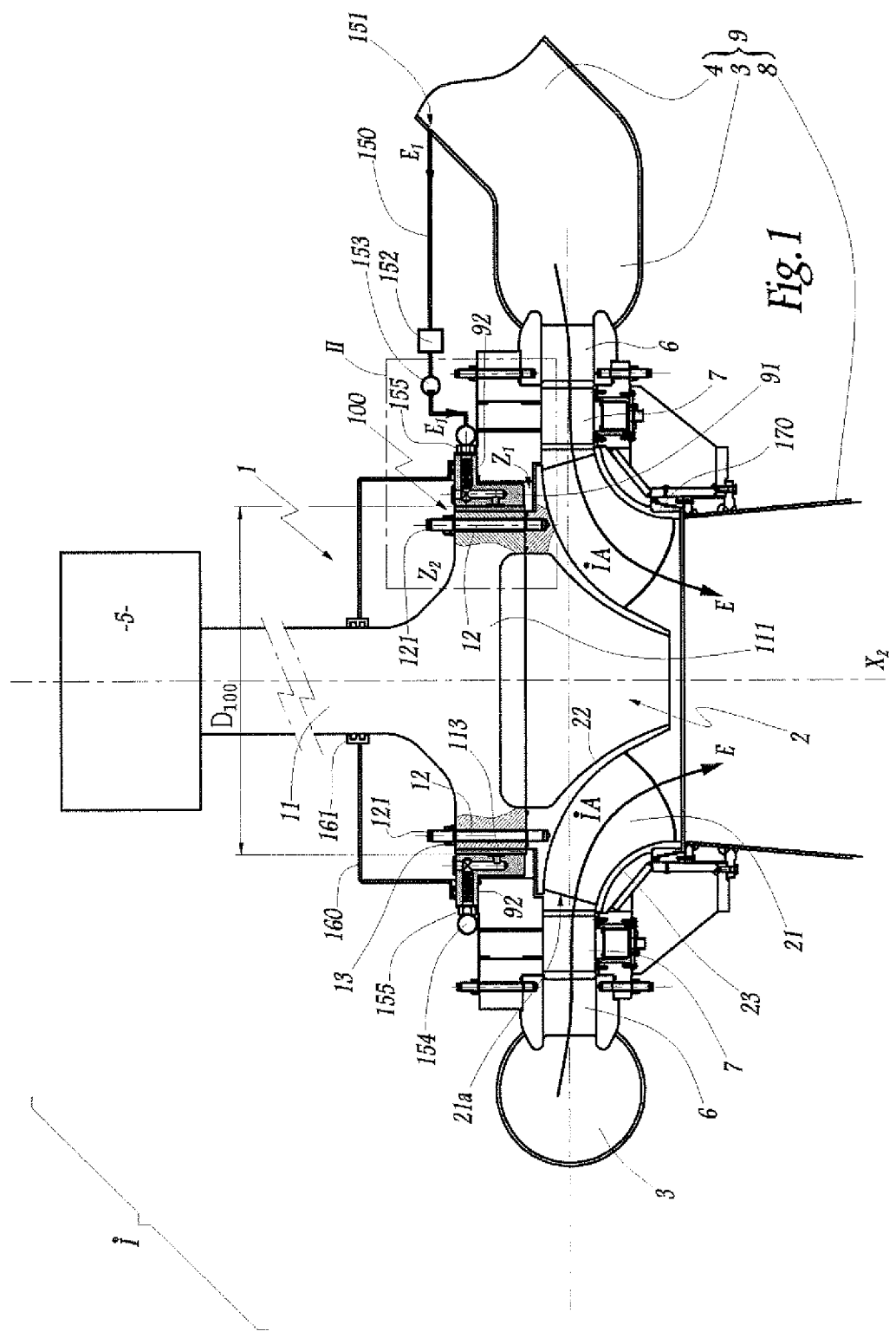
FIG. 1 is a section view showing the principle of an energy conversion installation of the invention that includes a Francis turbine of the invention.

The installation I shown in FIG. 1 includes a Francis turbine 1 whose wheel or "runner" 2 is fed from a casing 3 into which a forced-flow duct 4 opens out. The turbine 1 is coupled via a shaft 11 to an alternator 5. Between the casing 3 and the wheel 2 there is disposed a series of stay vane blades 6 and of wicket gates 7 whose function is to guide a flow E that is coming from the duct 4 and from the casing 3 and that is to pass through the wheel 2 towards a discharge conduit 8.

The axis of rotation of the wheel is stationary and is referenced $X_2$.

The wheel 2 is provided with blades 21 that extend between a ceiling 22 and a belt 23. The blades co-operate with one another and with the ceiling 22 and the belt 23 to define inter-blade spaces IA through which the flow E passes while it is flowing through the wheel 2.

The wheel 2 is fastened to the bottom end 111 of the shaft 11 by means of pins 12 that pass through orifices 112 provided in the end 111 and that are engaged in tapped holes 221 provided in the ceiling 22. A nut 13 is mounted around each pin 12 once said pin has been tightened into the corresponding tapped hole 221, by means of its polygonal head 121.

Figure 2:
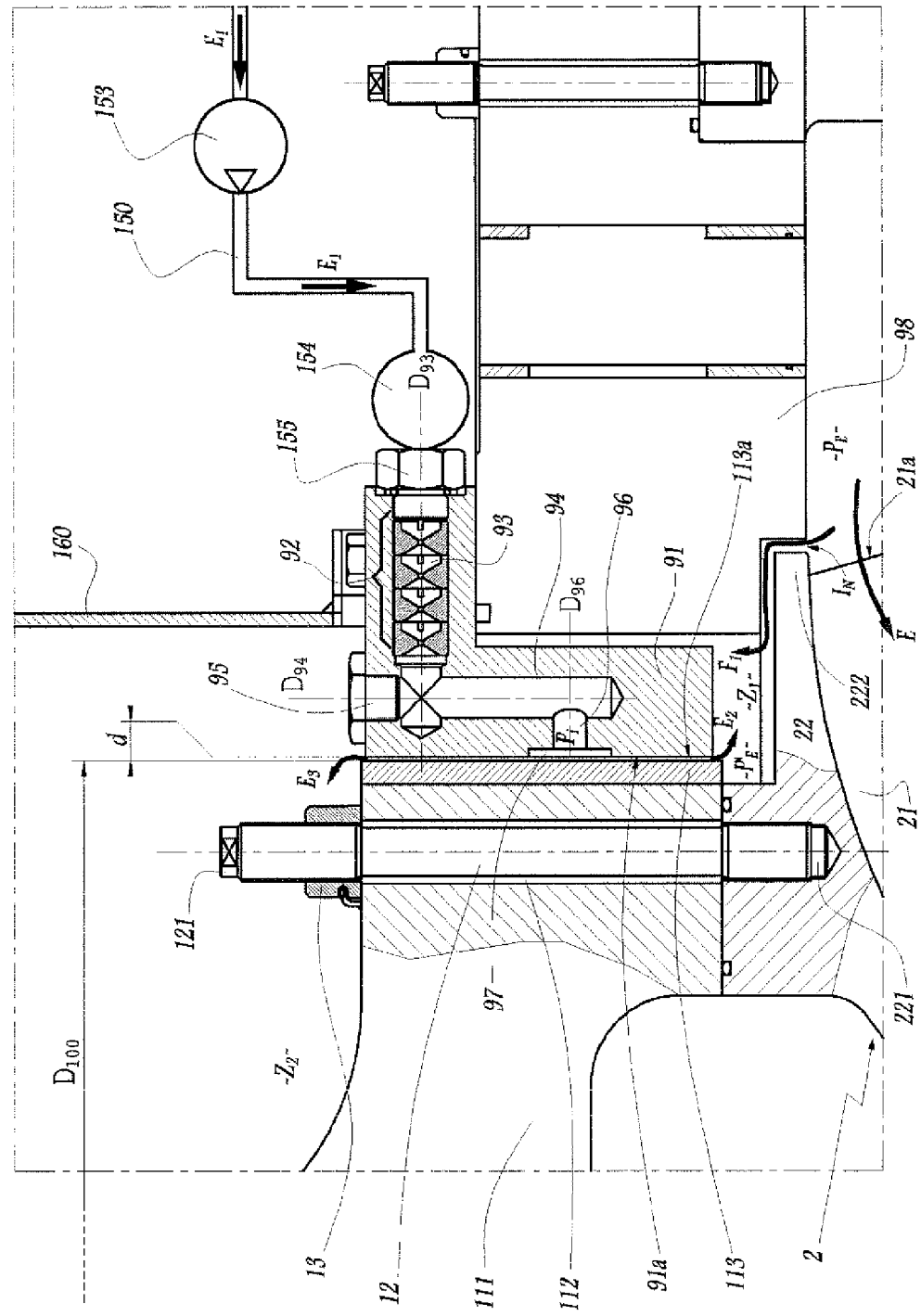
FIG. 2 is a view on a larger scale of the detail II of FIG. 1.

The casing 3, the duct 4, and the conduit 8 are part of a stationary structure 9 that is shown in fragmentary manner only in FIGS. 1 and 2, and that supports the rotary portions of the turbine 1, in particular the shaft 11 and the wheel 2.

A hydrostatic bearing 100 is formed around the end 111 of the shaft 11. This bearing 100 is defined between a ring or band 113 mounted around the end 111 and an annular element 91 disposed around said ring, with a small amount of clearance. The annular element 91 is part of the stationary structure 9. It is thus stationary in rotation relative to the axis $X_2$.

Reference d indicates the distance, measured radially relative to the axis $X_2$, between the radially outside surface 113a of the ring 113 and the radially inside surface 91a of the element 91. The distance d is the radial clearance of the bearing 100 that is defined between these surfaces. It has a value of less than 0.5 mm for a bearing whose diameter $D_{100}$ lies in the range 1.5 m to 2 m. The value of the thickness d advantageously lies in the range 0.1 mm to 0.2 mm under the above-mentioned conditions. This value is exaggerated in FIG. 2. The value of the radial clearance d is determined in order to ensure that the bearing 100 operates hydrostatically.

This value is substantially less than the usual clearance in a labyrinth, which clearance lies approximately in the range 1 m to 3 mm.

The bearing 100 is fed with water from the forced-flow duct 4. A pipe 150 connects a tap-off 151 provided in the duct 4 to a filter 152 that is designed to remove the impurities from the water coming from the duct 4, such impurities being, in particular, any grains of sand that said water might be carrying. The flow of water through the pipe 150 is referenced $E_1$. This flow has a flow-rate considerably less than the flow-rate of the flow E that passes through the elements 6, 7, and 2, as explained above. In practice, the flow-rate of the flow $E_1$ has a value less than one third of the flow-rate of the flow through a conventional labyrinth of a prior art turbine.

The pipe 150 is extended downstream from the filter 152 to a pump 153 that makes it possible to increase the pressure of the water of the flow $E_1$. The pipe 150 is connected to a torus-shaped duct 154 centered on the axis $X_2$. The duct 154 makes it possible to feed the bearing 100 through the element 91 at a plurality of points distributed about the axis $X_2$. In the example shown, twelve feed points are provided for the bearing P, which points are distributed uniformly about the axis $X_2$, with an angular offset between two adjacent feed points of 30°.

The pump 153 is optional in the sense that the pressure of the flow $E_1$ at the tap-off 151 can be sufficient to feed the bearing 100.

At a feed point, the duct 154 is connected, via a tap-off 155, to a series of diaphragms 92 mounted one behind another in a conduit 93 provided inside the element 91. This conduit 93 extends in a direction $D_1$ that essentially radial relative to the axis $X_2$ and opens out into a second conduit 94 whose main direction $D_{94}$ is perpendicular to the direction of the conduit 93 and parallel to the axis $X_2$. This conduit 93 is closed off, at the top portion of the element 91 by a screw 95.

A third conduit 96 extends parallel to the conduit 93, i.e. in a direction $D_{96}$ that is radial relative to the axis $X_2$, and it connects the conduit 94 to a cavity 97 provided in the surface 91a. Thus, the water coming from the duct 4 can be injected into the bearing 100 at the twelve cavities 97 at a pressure controlled by means of the pump 153 and by means of the series of diaphragms 92.

This injection of water distributed about the axis $X_2$ makes it possible to lubricate the hydrostatic bearing 100 while the wheel 2 and the shaft 11 are moving in rotation relative to the structure 9.

This mode of injecting water into the hydrostatic bearing makes it possible to balance the movement in rotation of the wheel 2 about the axis $X_2$. Considering the two water injection points shown respectively on the left and on the right of FIG. 1, it is possible to imagine the situation when the wheel 2 tends to shift towards the left of FIG. 1 relative to the axis $X_2$, e.g. under the effect of transient imbalance. In such a situation, the thickness d of the bearing 100 tends to increase on the same side as the injection point situated on the right of FIG. 1, and the throttling of the water exiting from the cavity 97 situated on the right of FIG. 1 is lower, so that the flow-rate of water exiting from that cavity tends to increase. As a result the head loss in the series of diaphragms 92 increases, so that the pressure of the water flowing through the conduits 94 and 96 and then into the cavity 97 decreases. In other words, a shift of the wheel 2 leftwards in FIG. 1 tends to reduce the pressure at which the water is injected into the bearing 100, at the injection point shown on the right of this figure.

Conversely, the same shift reduces the thickness d of the bearing at the injection point shown on the left side of FIG. 1. This induces a reduction in the flow-rate through the series of diaphragms 92 of this injection point. This reduction in flow-rate induces a reduction in the head loss through this series of diaphragms 92 and, as a result, an increase in the pressure of the water injected at said injection point into the bearing 100.

Thus, the wheel 2 shifting leftwards in FIG. 1 reduces the pressure in the bearing 100, at the injection point shown on the right of this figure, and increases the pressure at which water is injected into the bearing, at the injection point shown on the left of this figure. These pressure variations tend to re-align the wheel 2 on the axis $X_2$. The hydrostatic bearing 100 thus performs a function of centering the wheel 2 on its axis of rotation $X_2$.

Reference $P_E$ designates the pressure of the flow E at the inlet of the wheel 2, i.e. in the vicinities of the leading edges 21a of the blades 21 immediately downstream from the wicket gates 7. Reference 98 designates a support that is part of the stationary structure 9 and on which the element 91 is mounted. In order to enable the wheel 2 to rotate relative to the structure 9, an interstice $I_N$ is provided between the radially outer edge 222 of the ceiling 22 and the support 98. Due to the presence of this interstice, water flows from the inlet zone of the wheel 2, as indicated by arrow $F_1$, into a zone $Z_1$ that it fills to a pressure $P'_E$ that is of the same order of magnitude as the pressure $P_E$. In practice, the zone $Z_1$ is situated immediately below the bearing 100 and the value of the pressure $P'_E$ corresponds to more than 60% of the value of the pressure $P_E$, and preferably to more than 80% of the value of the pressure $P_E$.

A second zone $Z_2$ of the turbine 1 is defined that surrounds the shaft 11 in the vicinity of the heads 121 of the pins 12. This zone is normally not subjected to the pressure $P_E$ of the flow E. In practice, a minimum quantity of water is necessary in the zone $Z_2$. The pressure in the zone $Z_2$ is less than the pressure in the zone $Z_1$ and is preferably equal to atmospheric pressure.

The bearing 100 thus performs a function of isolation between the zone $Z_1$ in which water is present at a pressure $P'_E$ that is relatively high, and the zone $Z_2$ in which a residual quantity of water is present at low pressure. The bearing 100 can thus be said to be a "labyrinth bearing". This isolation function is obtained by means of the fact that, in operation, the bearing is fed with water through the pipe 150, the duct 154, and the various conduits 95, 96 and cavities 97. The water injected under pressure into the cavities 97 is distributed in the bearing 100 and thus prevents the water that is coming from the zone $Z_1$ from flowing towards the zone $Z_2$. This is to be compared with the fact that the pressure $P_I$ at which the water is injected into the cavities 97 is, by means of the pump 153 or by means of the pressure at the tap-off 151, greater than the pressure $P'_E$.

Thus, the hydrostatic bearing 100 prevents a fraction of the flow E that goes via the stay vane blades 6 and the wicket gates 7 from being lost due to a non-negligible leak at the zone $Z_1$, as it would be if a labyrinth were installed as in the state-of-the-art hydraulic machines. On the contrary, the presence of the hydrostatic bearing 100 between the zones $Z_1$ and $Z_2$ makes it possible to avoid such a leak or to limit such a leak very considerably. The quantity of water injected through the various cavities 97 is distributed in the bearing 100 and a fraction of said quantity flows by gravity into the zone $Z_1$. In other words, a fraction $E_2$ of the flow $E_1$ flows towards the zone $Z_1$ and, through the interstice $I_N$, can join the flow E to take part in driving the wheel 2 in rotation. This fraction $E_2$ of the flow is thus a driving flow for driving the machine.

Another fraction $E_3$ of the flow $E_1$ flows towards the zone $Z_2$ this fraction constituting the only genuine leak from the sum of the flows E and $E_1$. In view of the small radial clearance d of the bearing 100, this fraction of flow $E_3$ has a flow-rate that is very low compared with the flow-rate of the flow E, which constitutes progress compared with the state-of-the-art machines.

A cap 160 is disposed around the zone $Z_2$ and makes it possible to retain the small quantity of water that builds up therein due to the flow $E_3$. A drain (not shown) makes it possible to direct this small quantity of water towards a drainage well. At the interface between the shaft 11 and the cap 160, a set of baffles 161 is provided to limit the risks of splashing.

The surfaces 113a and 91a are treated to withstand wear and seizing for extreme situations of water feed interruptions. The presence of a coating or lining prevents the bearing 100 from being damaged in such extreme situations.

In a first embodiment, the ring or band 113 is not essential and a coating as mentioned above could be deposited directly on the radially outside surface of the end 111.

Figure 3:
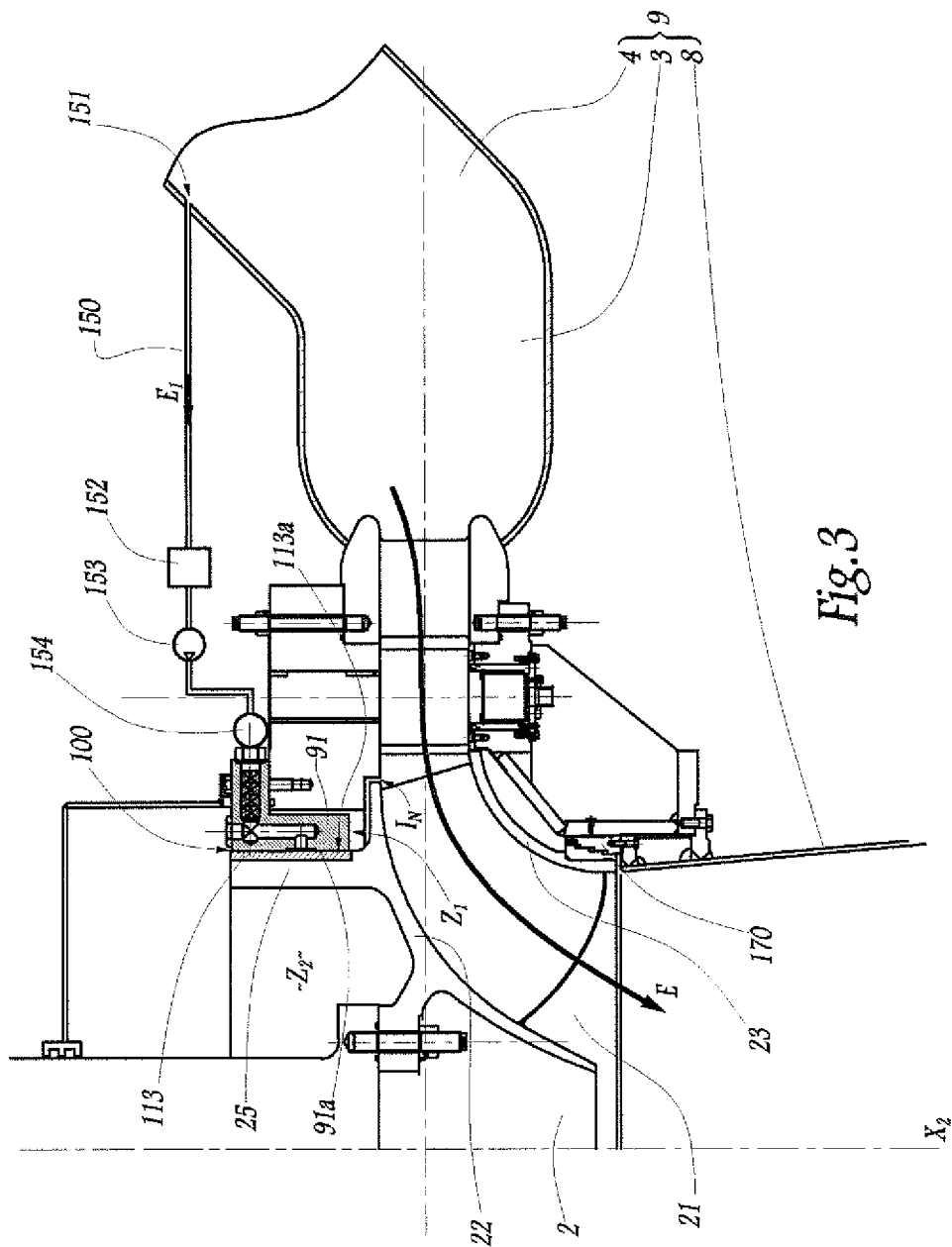
FIG. 3 is a half-section view corresponding to the bottom right portion of FIG. 1, for an installation and a machine in a second embodiment of the invention.

In the second embodiment of the invention shown in FIG. 3, the elements analogous to the elements of the first embodiment bear like references. In the description below, only what distinguishes the second embodiment from the first embodiment is described.

The hydrostatic bearing 100 is provided between an annular element 91 belonging to the stationary structure and a fin 25 that is integral with the ceiling 22 of the wheel 2. A band 113 is mounted around the fin 25 and its radially outside surface 113a co-operates with the radially inside surface 91a of the element 91 to form the bearing 100. A zone $Z_1$ is defined immediately under the element 91 and it is in fluid communication, through an interstice I, with the flow E flowing through the wheel 2. A zone $Z_2$ is defined radially between the fin 25 and the bottom end 111 of the shaft 11. The hydrostatic bearing 100 makes it possible to isolate the zone $Z_1$, in which the water is at a relatively high pressure, from the zone $Z_2$, in which the water is at a low pressure, the pressure in the zone $Z_2$ preferably being equal to atmospheric pressure.

As in the first embodiment, the band 113 may be omitted. In which case, the bearing 100 is defined between the radially outside surface of the fin 25, optionally coated with an appropriate coating, and the surface 91a.

Figure 4:
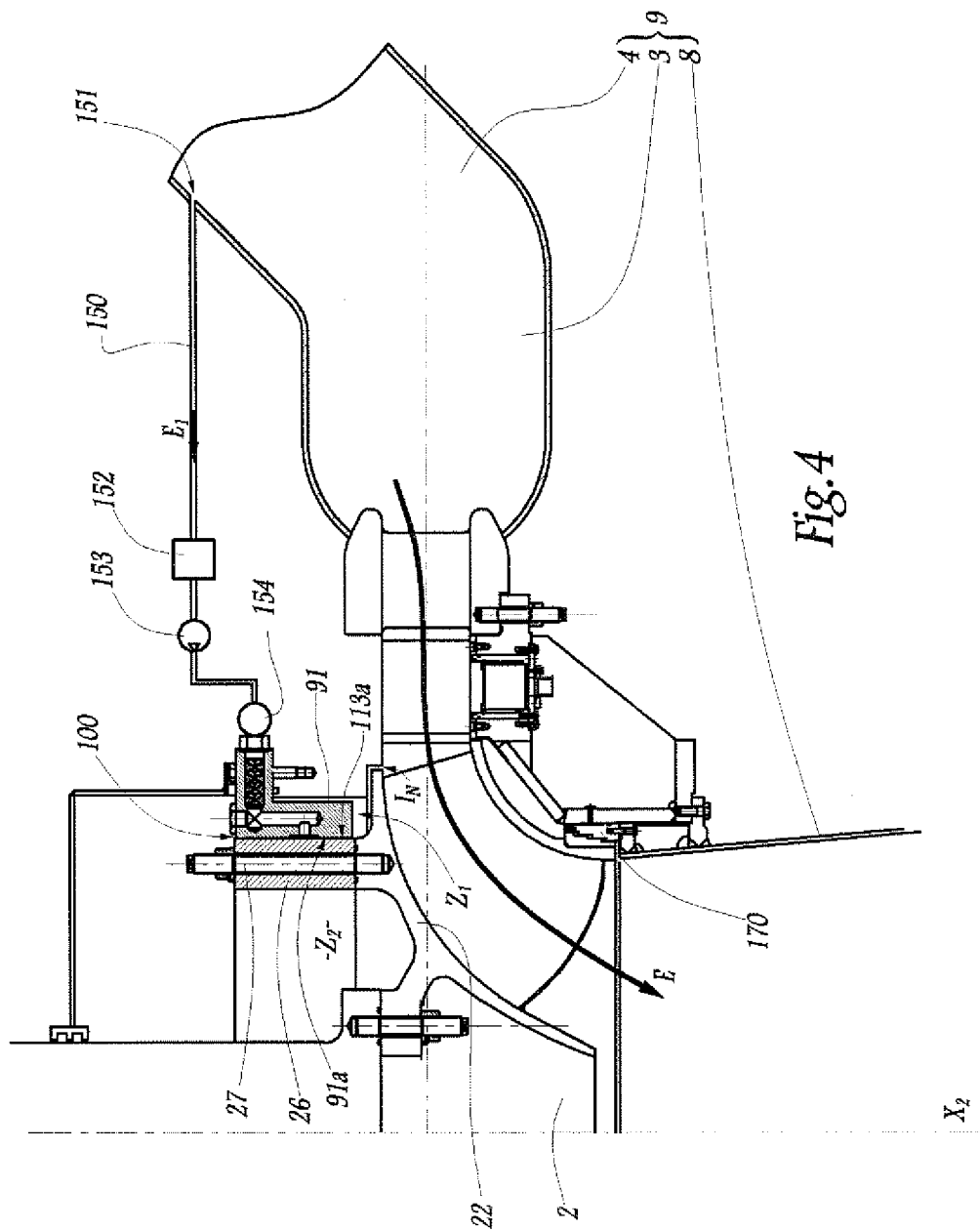
FIG. 4 is a half-section view analogous to FIG. 3 for an installation and a machine in a third embodiment of the invention.

In the third embodiment of the invention shown in FIG. 4, the elements analogous to the elements of the first embodiment bear like references. In the description below, only what distinguishes the third embodiment from the first embodiment is described.

A ring 26 is mounted on the ceiling 22 of the wheel 2 by means of screws 27 distributed around the periphery of said ceiling. This ring 26 is made of a material comparable to the material of the bands 113 of the first and second embodiments. It is optionally coated with a suitable coating on its radially outside surface 113a that faces towards the radially inside surface 91a of an element 91 of the stationary portion with which the ring 26 defines the hydrostatic bearing 100. As above, said bearing 100 makes it possible to isolate from each other a high-pressure zone $Z_1$ situated under the element 91 and in fluid communication through an interstice $I_N$ with the flow E going via the wheel 2, and a low-pressure zone $Z_2$ situated between the ring 26 and the bottom end 111 of the shaft 11 of the turbine 1.

The bearings 100 of the second and third embodiments perform a centering function, like the bearing of the first embodiment. They operate in the same manner and are therefore not described in any more detail.

Regardless of the embodiment in question, reducing the radial clearance, i.e. reducing the thickness d, of the hydrostatic bearing, compared with the clearance of labyrinths of machines of conventional design, makes it possible to limit considerably the losses by leakage, and to increase the efficiency of the turbine 1. Such losses are limited to the flow $E_3$ of the first embodiment and to the corresponding flows of the other embodiments. In addition, the positioning of the hydrostatic bearing 100, which is relatively close to the axis $X_2$ with a diameter of less than 2 m, makes it possible for the wheel to be centered properly while it is operating, and to achieve a reduction in the movements of shafts perpendicular to the axis $X_2$. This reduction in unwanted movements facilitates design of the labyrinth 170 installed between the belt 23 and the stationary structure 9 in order to limit the leakages in the downstream zone of the wheel. This also improves the efficiency of the turbine 1.

By its design and its positioning in the machine 1, the hydrostatic bearing 100 performs the respective functions of labyrinth, of bearing, and of shaft seal of the state-of-the-art machines, which is advantageous in terms of manufacturing cost, and of maintenance cost.

The invention is not limited to the examples described and may be implemented with turbines, with pumps, in particular centrifugal pumps, or with pump turbines other than a Francis turbine.

The invention claimed is:

1. A hydraulic machine having a wheel mounted to a shaft so as to be movable in rotation relative to a stationary structure and about a stationary axis of rotation, the wheel being designed to receive a forced flow of water, a hydrostatic bearing adapted to provide a centering function for the wheel with respect to the axis of rotation, and the hydrostatic bearing being positioned between opposing faces of an element that rotates with the wheel and a portion of the stationary structure so as to be disposed between first and second zones of the machine, the first zone being in fluid communication with the forced flow so that, during operation of the wheel, a pressure prevails in the first zone that is similar to the pressure of the forced flow, and the second zone of the machine is isolated from the forced flow by the hydrostatic bearing, and wherein water supply means communicate through the stationary structure with a plurality of cavities distributed uniformly about the hydrostatic bearing and by way of which the water is injected into the hydrostatic bearing; and wherein the water supply means includes a flow duct for channeling water through the portion of the stationary structure, a pump means for increasing the pressure of water in the flow duct, and a plurality of in line diaphragms installed one after the other in the flow duct and adapted to, in conjunction with the pump means, control a pressure of the water injected from the plurality of cavities into the bearing.

2. The machine according to claim 1, wherein the hydrostatic bearing is provided, about the axis of rotation of the wheel, at an area of junction between the wheel and a shaft.

3. The machine according to claim 1, wherein the element that rotates with the wheel is mounted on an end of the shaft on which the wheel is mounted.

4. The machine according to claim 1, wherein the element that rotates with the wheel is formed by a member that is integral with the wheel.

5. The machine according to claim 1, wherein the element that rotates with the wheel is mounted removably on the wheel.

6. The machine according to claim 1, wherein a radial clearance of the hydrostatic bearing is less than 0.5 mm for a bearing in a range 1.5 m to 2 m.

7. An installation for converting hydraulic energy into electrical energy, or vice versa, the installation machine according to claim 1.

8. The machine according to claim 1, wherein a radial clearance of the hydrostatic bearing is in a range of 0.1 mm to 0.2 mm for a bearing of diameter being in a range 1.5 m to 2 m.

* * * * *